United States Patent [19]

Okanoue

[11] Patent Number: 5,202,903
[45] Date of Patent: Apr. 13, 1993

[54] NOISE-IMMUNE SPACE DIVERSITY RECEIVER

[75] Inventor: Kazuhiro Okanoue, Tokyo, Japan

[73] Assignee: NEC Corporation, Tokyo, Japan

[21] Appl. No.: 678,497

[22] Filed: Apr. 1, 1991

[30] Foreign Application Priority Data

Mar. 30, 1990 [JP] Japan .................................. 2-83478
Mar. 30, 1990 [JP] Japan .................................. 2-83479

[51] Int. Cl.$^5$ ........................... H04B 7/10; H04L 1/02
[52] U.S. Cl. ...................................... 375/100; 375/94; 375/96; 375/102
[58] Field of Search ...................... 375/38, 40, 14, 100, 375/102, 96, 94; 455/132, 133, 134; 371/43, 44, 45

[56] References Cited

U.S. PATENT DOCUMENTS

| | | | |
|---|---|---|---|
| 4,160,952 | 7/1979 | Seastrand, Jr. ..................... | 375/100 |
| 4,733,402 | 3/1988 | Monsen .............................. | 455/134 |
| 5,031,193 | 7/1991 | Atkinson et al. ................... | 375/100 |
| 5,065,411 | 11/1991 | Muto ................................... | 375/14 |

OTHER PUBLICATIONS

Adaptive Matched Filter and its Significance to Anti--multipath Fading, by Kojiro Watanabe, C&C Systems Research Laboratories, NEC Corporation, pp. 1455-1459.

A New Post-detection Selection Diversity with MLSE Equalization, by Kazuhiro Okanoue et al. C&C Systems Research Laboratories, NEC Corporation, pp. 2-172.

The Viterbi Algorithm Applied to Digital Data Transmission, by J. F. Hayes, pp. 15-20.

Adaptive Equalization of the Slow Fading Channel, by Peter Monsen, IEE Transactions on Communications, vol. COM-22, No. 8, aug. 1974, pp. 1064-1075.

Primary Examiner—Stephen Chin
Attorney, Agent, or Firm—Sughrue, Mion, Zinn, Macpeak & Seas

[57] ABSTRACT

In a space diversity receiver, matched filters and a like number of channel estimators are respectively coupled to diversity antennas to receive sequentially coded symbol sequences. A branch metric calculator receives the outputs of the matched filters and the estimates from the channel estimators to calculate a branch metric of the received sequences for coupling to a maximum likelihood (ML) estimator. The branch metric is obtained by summing branch metric coefficients derived from channel estimates respectively with the output of the matched filters or by summing branch metric coefficients derived from a vector sum of channel estimates with the matched filter outputs. In another embodiment, adaptive channel estimators are provided for deriving channel estimates from received sequences and the output of an ML estimator. First branch metrics are derived from the received sequences and supplied to a branch metric quality estimator in which quality estimates of the channels are derived from the first branch metrics. An evaluation circuit evaluates the first branch metrics according to the quality estimates and produces a second branch metric for coupling to the ML estimator.

12 Claims, 9 Drawing Sheets

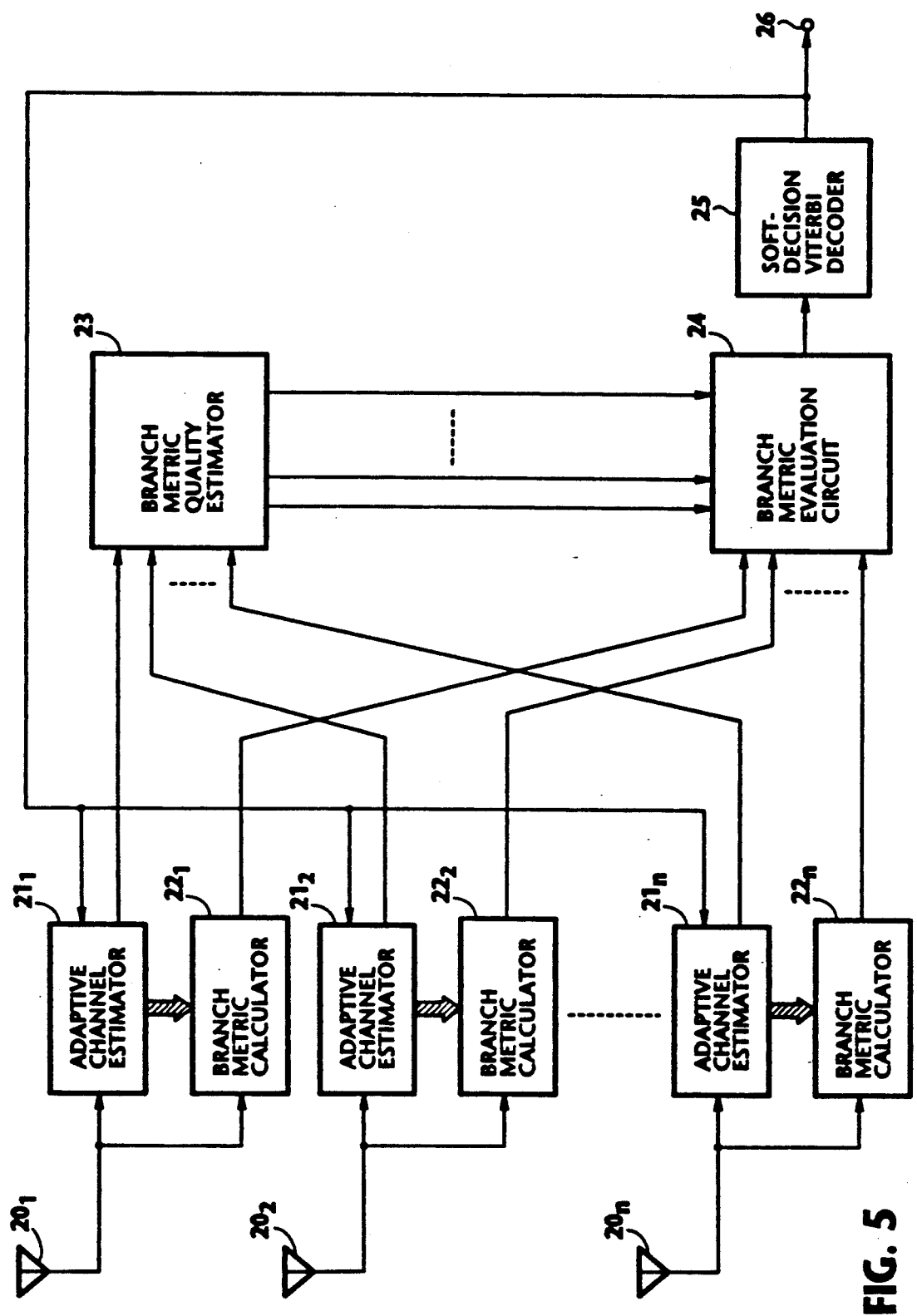

NOISE-IMMUNE SPACE DIVERSITY RECEIVER

RELATED APPLICATION

The present invention is related to Co-pending U.S. patent application Ser. No. 07/517,883, titled "Space Diversity TDMA Receiver", K. Okanoue, filed May 2, 1990 and assigned to the same assignee as the present invention.

BACKGROUND OF THE INVENTION

The present invention relates to diversity reception of signals propagating over distinct fading channels.

It is known to combine a diversity system with an equalization system for purposes of improving the performance of a receiver. One such technique is the decision feedback equalization in which matched filters or forward equalizers are provided respectively at diversity antennas and their outputs are combined and fed into a decision-feedback equalizer (as described in K. Watanabe, "Adaptive Matched Filter And Its Significance To Anti-Multipath Fading", IEEE publication (CH2314-3/86/0000-1455) 1986, pages 1455 to 1459, and P. Monsen, "Adaptive Equalization of The Slow Fading Channel", IEEE, Transactions of Communications, Vol. COM-22, No. 8, August 1974).

Another technique is the maximum likelihood estimation in which the quality (spread of intersymbol interference and signal to noise ratio) of a received signal at each diversity antenna is estimated and a signal having the largest value is selected on the basis of the quality estimates (as described in Okanoue, Furuya, "A New Post-Detection Selection Diversity With MLSE Equalization", B-502, Institutes of Electronics Information and Communications, Autumn National Meeting, 1989). To implement the maximum likelihood sequence estimation, the Viterbi algorithm is well known. By summing constants uniquely determined by matched filters and communication channels (as defined by the second and third right terms of Equation 8b, page 18, J. F. Hayes, "The Viterbi Algorithm Applied to Digital Data Transmission", IEEE Communication Society, 1975, No. 13, pages 15-20), a branch metric of received symbol sequences is determined and fed into a soft-decision Viterbi decoder.

However, prior art systems are still not satisfactory if the branch metric is severely affected by channel noise and intersymbol interference. In addition, if variabilities exist in signal to noise ratio between signals received by different diversity antennas during a deep fade, all such signals will be treated alike and an error is likely to result in maximum likelihood sequence estimation.

SUMMARY OF THE INVENTION

It is therefore an object of the present invention to provide a space diversity receiver for a communications system in which the quality of reception is significantly affected by channel noise and intersymbol interference.

According to a first aspect of the present invention, there is provided a diversity receiver having a plurality of diversity antennas for simultaneously receiving sequentially coded symbol sequences propagating over distinct communications channels from a point of transmission to the antennas. The receiver comprises a plurality of channel estimators respectively coupled to the antennas for deriving respective estimates of impulse responses of the communication channels from the received sequences. A plurality of matched filters are associated respectively with the channel estimators and the diversity antennas. Each of the matched filters has a tapped delay line coupled to the associated antenna and a plurality of multipliers coupled respectively to successive taps of the tapped delay line for controlling tap weight coefficients of the multipliers in response to an output signal from the associated channel estimator and integrating weighted signals generated by the multipliers to produce a matched filter output. A branch metric calculator is provided for receiving the outputs of the matched filters and the estimates from the channel estimators for calculating a branch metric of the signals received by the antennas for coupling to a maximum likelihood sequence estimator.

Specifically, in one embodiment, the branch metric calculator comprises a plurality of branch metric coefficient calculators which respectively receive output signals from the channel estimators to calculate branch metric coefficients. A plurality of first adders provide summation of output signals from the branch metric coefficient calculators with output signals from the matched filters, and a second adder provides summation of the outputs of the first adders to produce a branch metric. In a modified embodiment, the the branch metric calculator comprises a vector adder for providing vector summation of impulse response vectors from the channel estimators to produce an output impulse response vector. A branch metric coefficient calculator is provided for deriving a branch metric coefficient from the output impulse response vector. The output signals from the matched filters are summed with the branch metric coefficient to produce a branch metric.

According to a second aspect of the present invention, a plurality of adaptive channel estimators are respectively coupled to the diversity antennas for deriving estimates of impulse responses of the communication channels respectively from the received sequences and a previously received signal. A plurality of branch metric calculators are also coupled respectively to the diversity antennas for deriving first branch metrics respectively from the received sequences. A branch metric quality estimator is coupled to the adaptive channel estimators for deriving from output signals of the channel estimators a plurality of branch metric quality estimates of the communications channels, respectively. A branch metric evaluation circuit is coupled to the branch metric calculators and the branch metric quality estimator for evaluating the first branch metrics in accordance with the branch metric quality estimates and producing a second branch metric. A maximum likelihood sequence estimator derives a maximum likelihood estimate of the received sequences from the second metric branch and applies it to the adaptive channel estimators as the previous signal.

BRIEF DESCRIPTION OF THE DRAWINGS

The present invention will be described in further detail with reference to the accompanying drawings, in which:

FIG. 5 shows in block form a space diversity receiver according to a second embodiment of the present invention;

DETAILED DESCRIPTION

Figure 1:
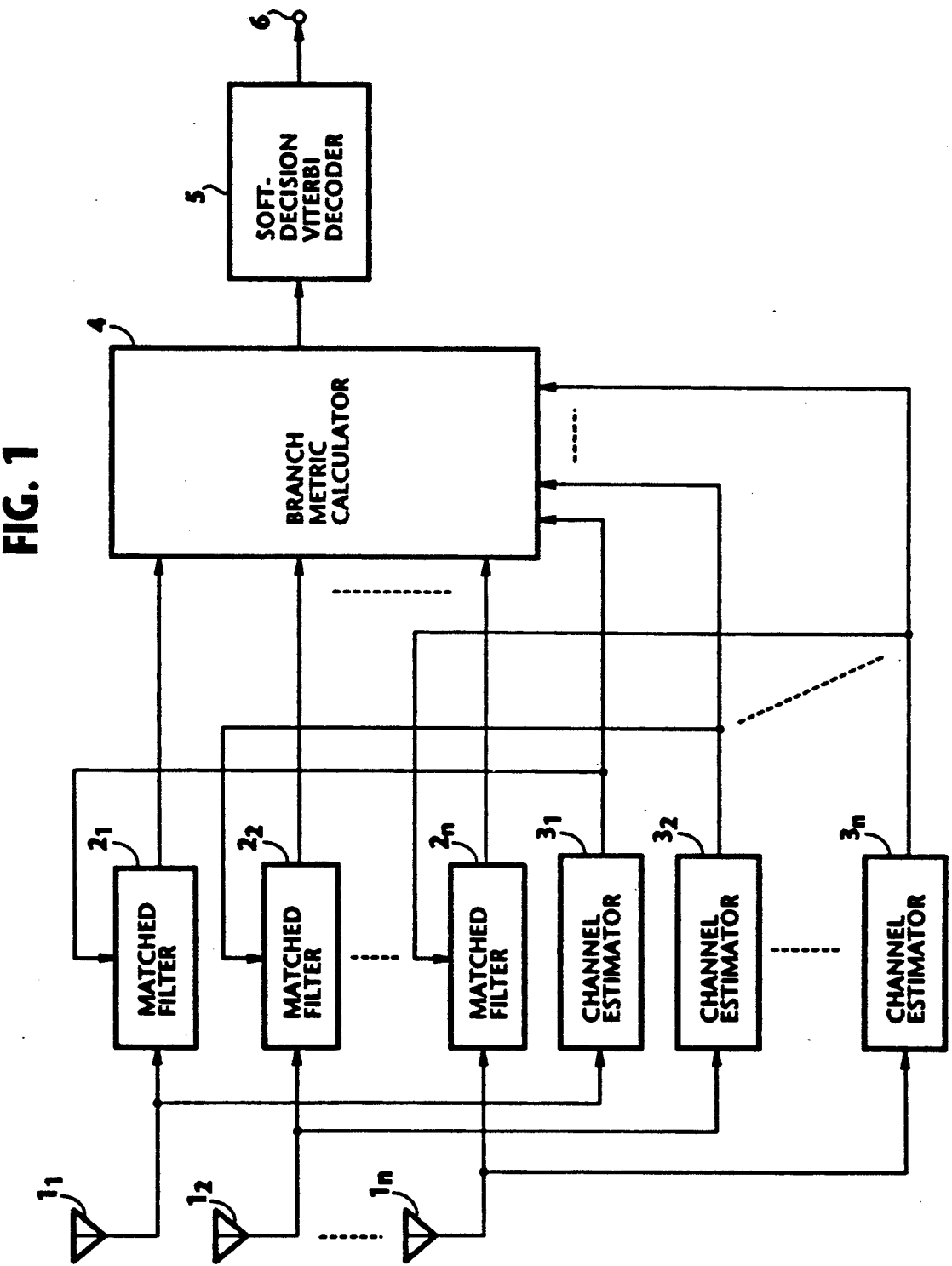
FIG. 1 shows in block form a space diversity receiver according to a first embodiment of the present invention.

Referring now to FIG. 1, there is shown a diversity receiver according to the present invention. The receiver has a plurality of diversity antennas $1_1$-$1_n$ which are respectively coupled to matched filters $2_1$-$2_n$. Diversity antennas $1_1 \sim 1_n$ are further coupled to channel estimators $3_1$-$3_n$, respectively, for generating estimates of the impulse responses of the corresponding channels from the point of transmission to the diversity antennas. Channel estimators $3_1$-$3_n$ are associated respectively with matched filters $2_1 \sim 2_n$. The outputs of channel estimators $3_1 \sim 3_n$ are respectively coupled to control inputs of the associated matched filters $2_1 \sim 2_n$ to adaptively control their internal states, or tap weight coefficients. The outputs of channel estimators $3_1$-$3_n$ are further applied to a branch metric calculator 4 to which the outputs of matched filters $2_1$-$2_n$ are also applied. Branch metric calculator 4 derives a branch metric from the impulse response estimates and the outputs of the matched filters. A soft-decision Viterbi decoder 5, or maximum likelihood sequence estimator, of known design is coupled to the output of branch metric calculator 4. As is well known, the Viterbi decoder 5 comprises an add, compare and select (ACS) circuit and a path memory which is controlled by the output of ACS circuit to store branch metrics and detect a most likely symbol sequence for coupling to an output terminal 6 by tracing back through the stored metrics.

Figure 2:
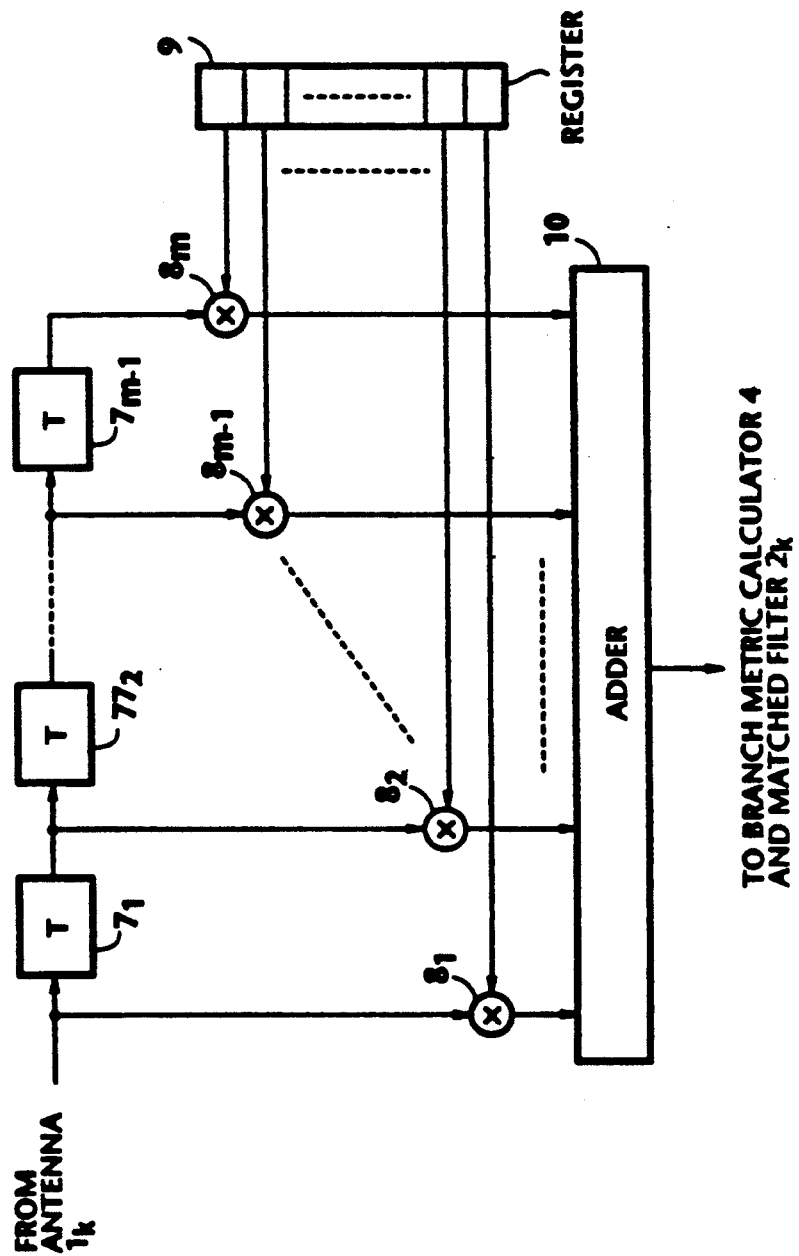
FIG. 2 shows details of each channel estimator of FIG. 1.

As illustrated in FIG. 2, each channel estimator $3_k$ (where k = 1, 2, ... n) is essentially of a transversal filter configuration comprising a tapped delay line with delay elements $7_1$-$7_{m-1}$ being connected in series to the associated diversity antenna $1_k$. Successive taps of the delay line are connected respectively to multipliers $8_1 \sim 8_m$ whose tap weights are controlled by corresponding tap weight coefficients stored in a registor 9. In a practical aspect, the stored tap weight coefficients are in the form of a sequence of alternating symbols which may appear at periodic intervals, such as carrier recovery sequence in the preamble of a burst signal. The symbols received by antenna $1_k$ are successively delayed and multiplied by the stored tap weight coefficients and summed by an adder 10 to produce a signal representative of the degree of cross-correlation between the arriving symbol sequence and the stored sequence. This signal is supplied from the adder 10 of each channel estimator $3_k$ to the corresponding matched filter $2_k$ as a channel impulse response estimate.

The matched filter is a well known device capable of maximizing signal to noise ratio (S. Stein and J. J. Jones, "Modern Communication Principles With Application to Digital Signaling", McGraw-Hill, Inc.). Each matched filter is also a transversal-filter-like configuration with a tapped delay line, a plurality of tap weight multipliers coupled respectively to the taps of the delay line, and an adder for integrating the outputs of the multipliers over a symbol interval to produce a matched filter output. The tap weight coefficients of each matched filter $2_k$ are controlled in accordance with the impulse response estimate of the corresponding communications channel which is supplied from the associated channel estimator $3_k$. Details of such matched filters are shown and described in the aforesaid Co-pending U.S. application.

Figure 3:
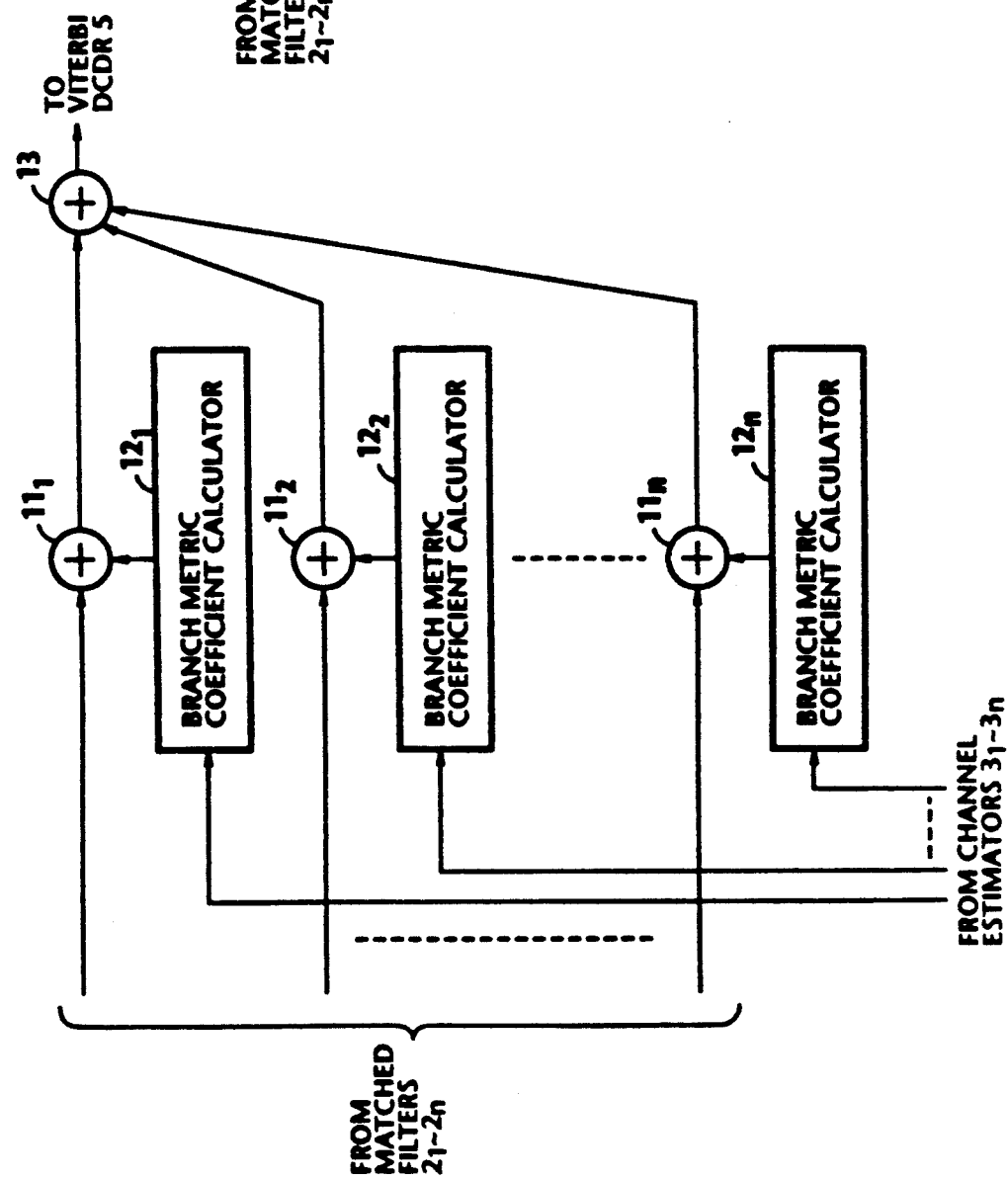
FIG. 3 shows in block form one embodiment of the branch metric calculator of FIG. 1.

As shown in FIG. 3, the branch metric calculator 4 comprises a plurality of adders $11_1 \sim 11_n$ corresponding respectively to matched filters $2_1$-$2_n$, a like number of branch metric coefficient calculators $12_1 \sim 12_n$, and an adder 13 whose output is coupled to the input of the Viterbi decoder 5. One input of each adder $11_k$ is coupled to the output of corresponding matched filter $2_k$ and another input of the adder is coupled to the output of corresponding branch metric coefficient calculator $12_k$. In this way, the output of each matched filter is summed with a corresponding branch metric coefficient by each adder 11 and further summed with the other outputs of adders 11 by adder 13 to produce a branch metric. The output of branch metric calculator 4 is coupled to Viterbi decoder 5 in which the maximum likelihood sequence estimation is made on the metrics to detect a most likely symbol sequence.

In operation, a digitally modulated, sequentially coded symbol sequence is transmitted from a distant station and propagates over distinct fading channels. On reception, replicas of the original sequence are detected by diversity antennas $1_1$-$1_n$ and filtered by corresponding matched filters $2_1$-$2_n$. The matched filters maximize the signal to noise ratios of the symbol sequences on the respective fading channels. Since the branch metric is a sum of the matched filter outputs and the branch metric coefficients uniquely determined by the impulse responses of the corresponding channels, the effect of white Gaussian noise on the branch metric can be reduced to a minimum.

Figure 4:
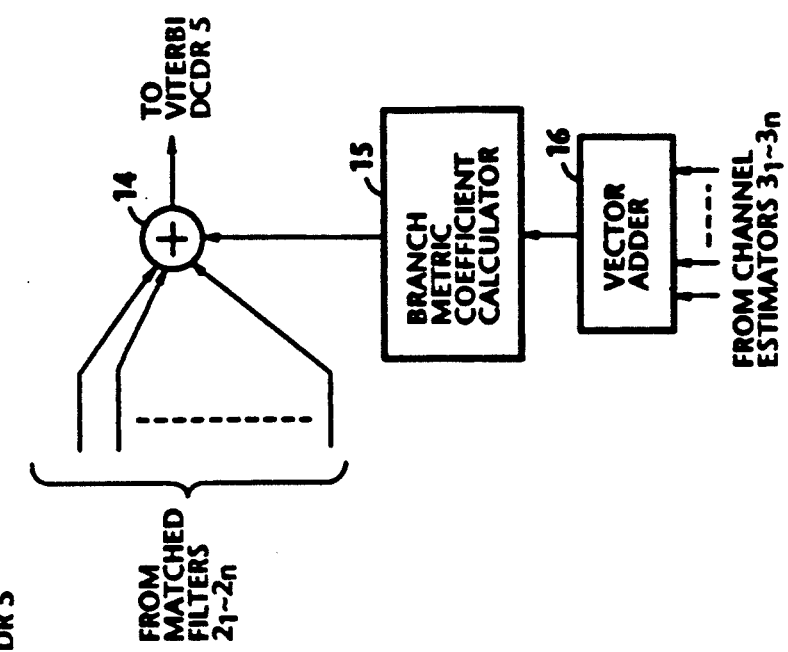
FIG. 4 shows in block form another embodiment of the branch metric calculator of FIG. 1.

A modified form of the branch metric calculator is shown in FIG. 4. The modified branch metric calculator comprises an adder 14, a branch metric coefficient calculator 15 and a vector adder 16. The impulse response estimates from channel estimators $3_1 \sim 3_n$ are applied to vector adder 16 as vectors $\bar{h}(k)$. and summed to produce a resultant vector $\bar{H}$.as an estimate of an overall impulse responses of the channels. The output of vector adder 16 is applied to branch metric coefficient calculator 15 to compute a branch metric coefficient. The branch metric coefficient is applied to adder 14 in which it is summed with the outputs matched filters $2_1$-$2_n$ to produce a branch metric for coupling to the Viterbi decoder 5. The modified branch metric calculator reduces multiplicative iterations required for deriving the metric coefficient by a factor 1/n as compared with the embodiment of FIG. 3.

A second embodiment of the diversity receiver of this invention is shown in FIG. 5, which is particularly useful for systems in which the intersymbol interference is time-variant. This embodiment comprises a plurality of adaptive channel estimators $21_1$-$21_n$ which are coupled respectively to diversity antennas $20_1$-$20_n$. Branch metric calculators $22_1$-$22_n$ of known design are also coupled respectively to diversity antennas $20_1 \sim 20_n$ and to adaptive channel estimators $21_1 \sim 21_n$. As will be described hereinbelow, each adaptive channel estimator $21_k$ derives tap weight coefficients and supplies them as a vector $\vec{h}_k(i+1)$ of the impulse response estimate of the channel k at the instant of time (i+1) to the associated branch metric calculator $22_k$ in which the vector is combined with a received symbol sequence to produce a branch metric. The output of each branch metric calculator 22 is coupled to a branch metric evaluation circuit 24. Each channel estimator $21_k$ further generates an error signal $e_k(i)$ which is applied to a branch metric quality estimator 23. Branch metric quality estimator 23 provides quality estimates of the branch metrics from branch metric calculators 22 and supplies its output signals to branch metric evaluation circuit 24 in which they are combined with the error signals to produce a final version of the branch metrics. The output of branch metric evaluation circuit 24 is applied to a soft-decision Viterbi decoder 25. The output of the Viterbi decoder 25 is supplied to an output terminal 26 on the one hand, and to adaptive channel estimators $21_1-21_n$ on the other, as a feedback signal.

Figure 6:
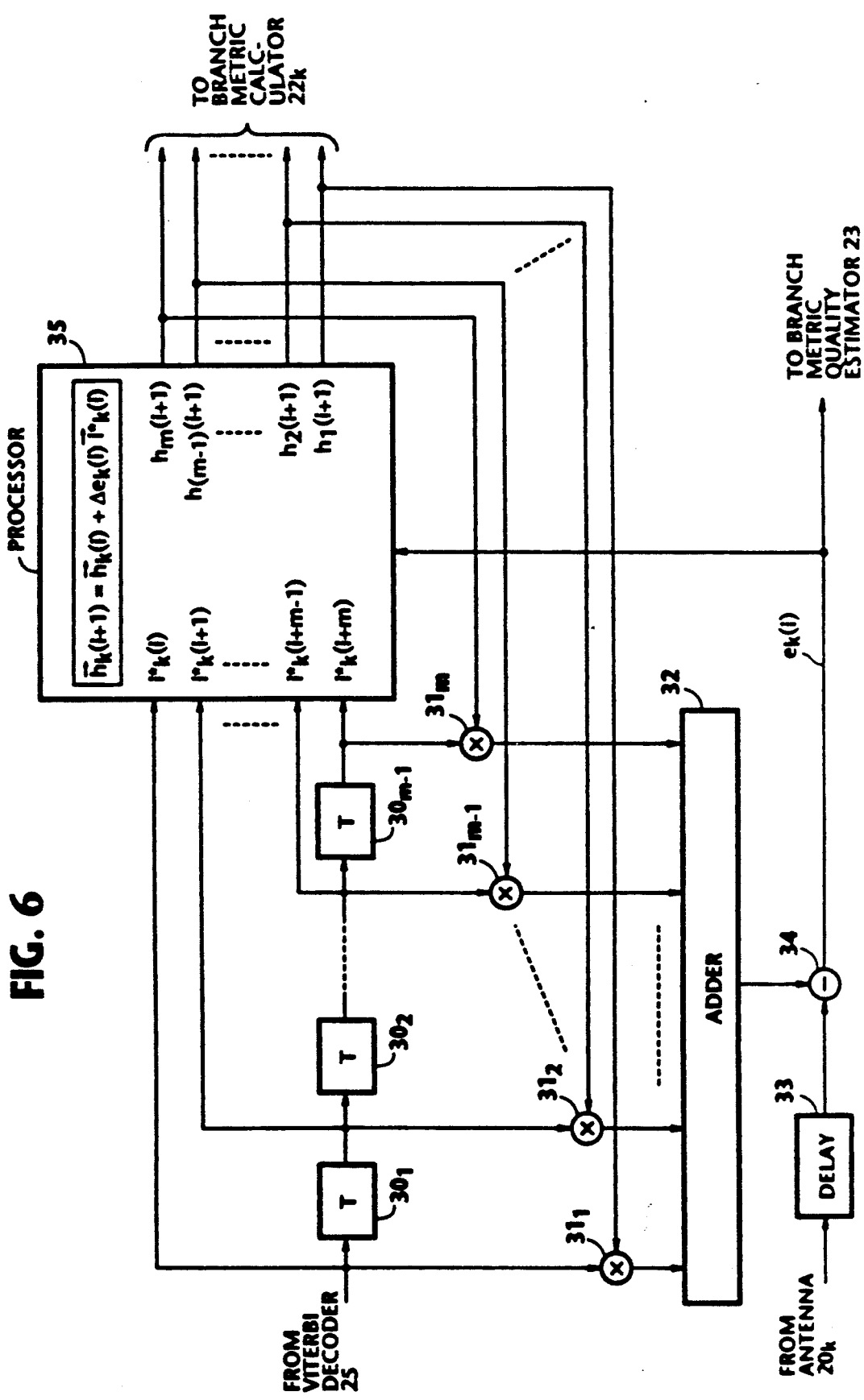
FIG. 6 shows details of each adaptive channel estimator of FIG. 5.

As shown in detail in FIG. 6, each adaptive channel estimator $21_k$ comprises a tapped delay line formed by a series of delay elements $30_1$ through $30_{m-1}$. To this tapped delay line is connected the output of the Viterbi decoder 25 to produce successively delayed versions of each decoded symbol across the delay line. Tap weight multipliers $31_1-31_{m-1}$ are coupled respectively to successive taps of the delay line to multiply the delayed signals by respective tap weight coefficients. An adder 32 produces a sum of the weighted signals for comparison with an signal supplied from a delay circuit 33. The output of the delay circuit 33 is the signal from the associated diversity antenna $20_k$ which is delayed by an amount corresponding to the time elapsed for each signal element from the time it enters the receiver to the time it leaves the Viterbi decoder 25. A difference between the outputs of adder 32 and delay circuit 33 is taken by a subtracter 34 to produce the error signal $e_k$, which is supplied to the branch metric quality estimator 23 as well as to a processor 35 to which the successive taps of the delay line are also connected.

Processor 35 has circuitry that initializes or conditions its internal state to produce an initial vector $\vec{h}_k(i)$ of channel impulse response estimates at time i and computes a vector $\vec{h}_k(i+1)$ of channel impulse response estimates at time i+1 using the following formula:

$$\vec{h}_k(i+1) = \vec{h}_k(i) + \Delta e_k \vec{i}^*_k(i)$$

where, $\Delta$ indicates the step size corresponding to the rate of variation of the intersymbol interference and $\vec{i}_k(i)$, denotes the vector of complex conjugates of detected information symbols. As the process continues in a feedback fashion, the vector $h_k(i)$ is successively updated with the error component $e_k$. The vector $\vec{n}_k(i+1)$ of channel impulse response estimates is supplied to the associated branch metric calculator $22_k$ as well as to multipliers $31_1-31_m$ as tap weight coefficients.

Figure 7:
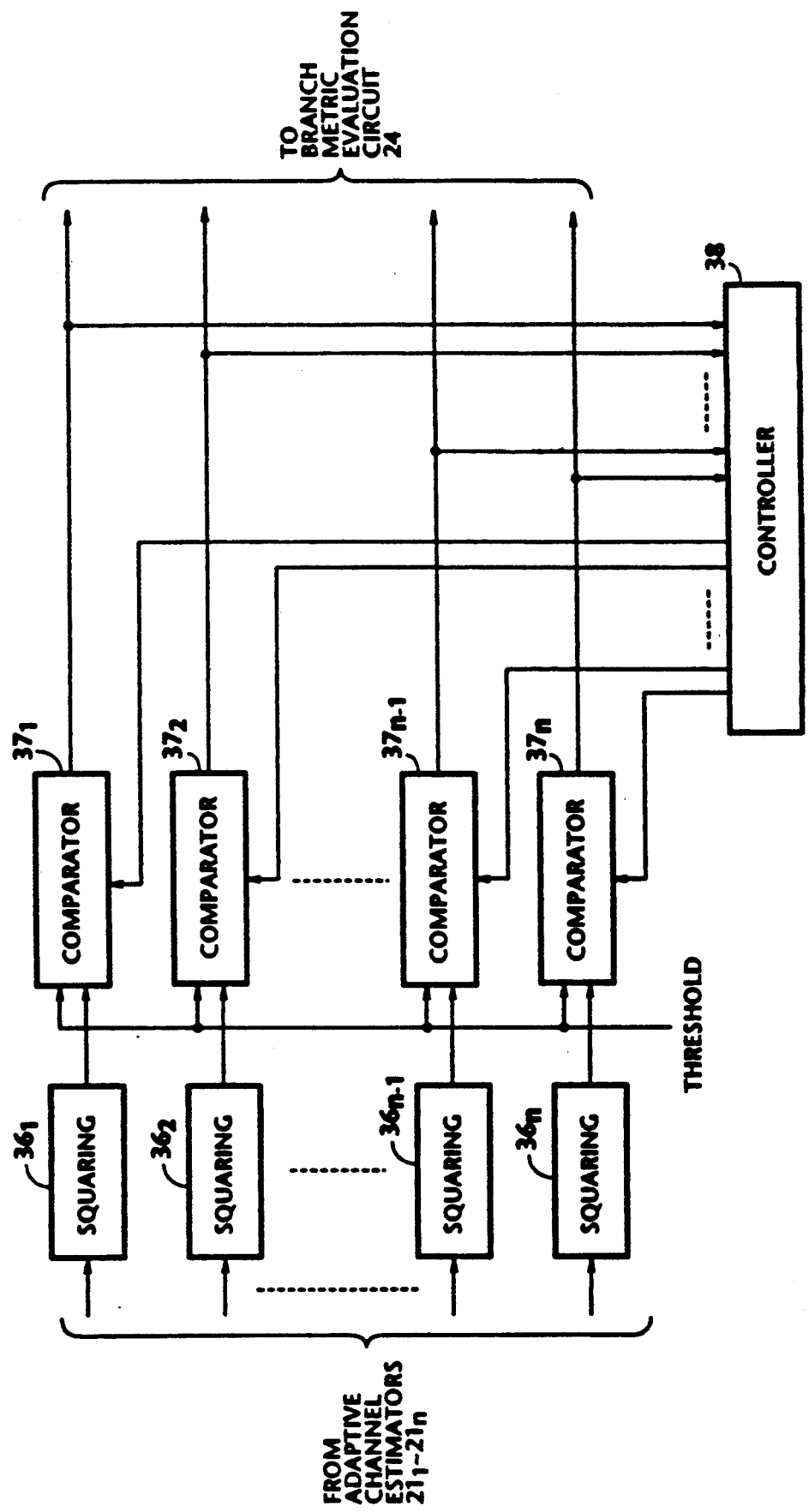
FIG. 7 shows details of the branch metric quality estimator of FIG. 5.

As shown in FIG. 7, the error signals from adaptive channel estimators $21_1 \sim 21_n$ are supplied to squaring circuits $36_1-36_n$ of branch metric quality estimator 23 to produce signals representative of the power of the error components. A like number of comparators $37_1-37_n$ are respectively coupled to the outputs of squaring circuits $36_1-36_n$ to determine if each of the detected power levels is higher or lower than a prescribed threshold value. If the input power is lower than the threshold value, each comparator generates a normal signal indicating that the quality of the received symbol is satisfactory. Conversely, if the power level is higher than the threshold, the comparator produces an alarm signal indicating that the received signal has corrupted. The outputs of comparators $37_1-37_n$ are applied to branch metric evaluation circuit 24 on the one hand and to a controller 38 on the other. In response to each alarm signal, controller 38 supplies a control signal to that comparator which produced the alarm signal to cause it to maintain the alarm signal. This hysteresis operation eliminates the objectionable effect which would otherwise be produced by the channel estimators 21 when impulse response estimation goes out of order because of their diverging characteristics.

Figure 8:
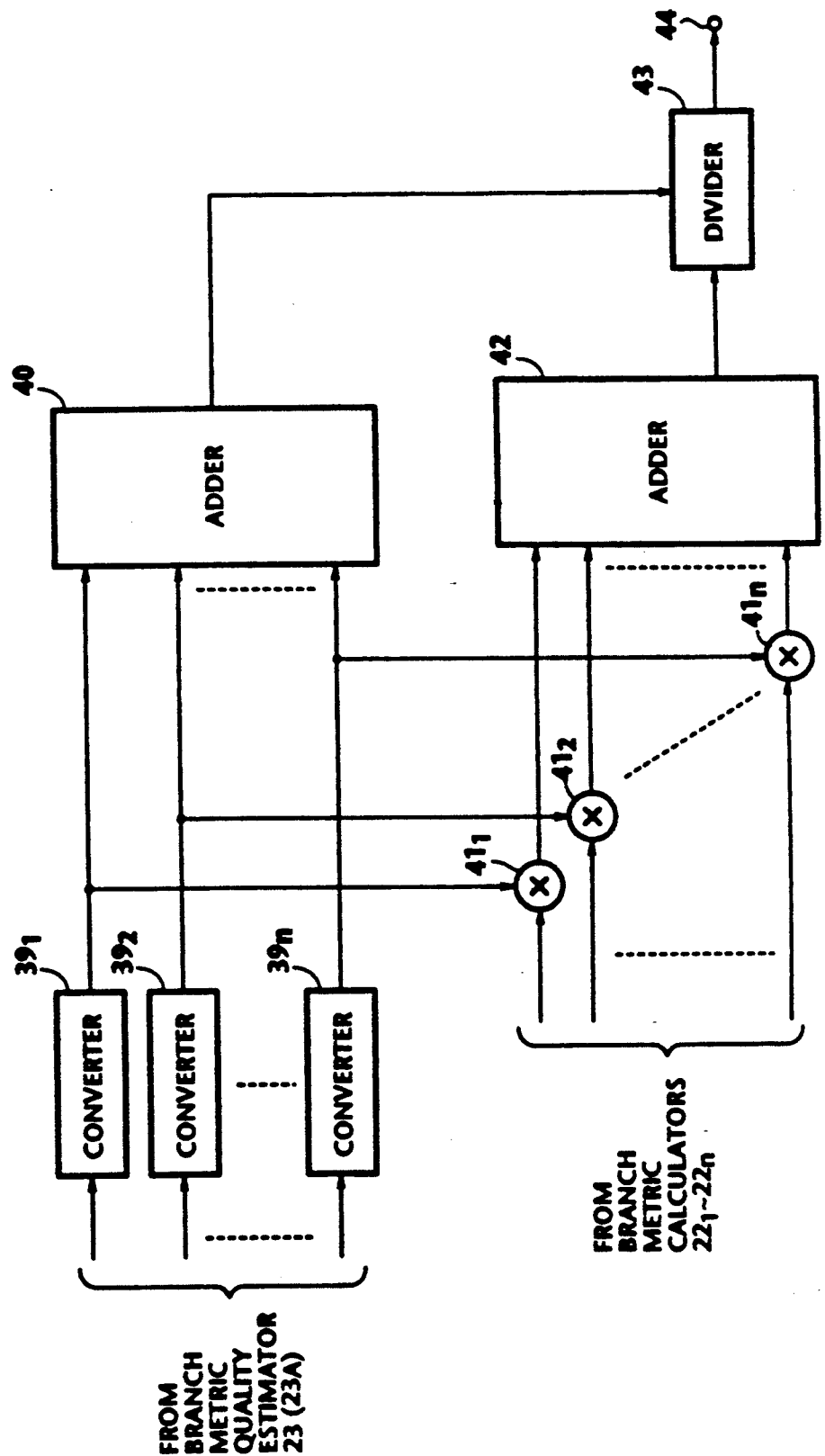
FIG. 8 shows details of the branch metric evaluation circuit of FIG. 5.

As shown in detail in FIG. 8, the outputs of branch metric quality estimator 23 are applied to binary converters $39_1-39_n$, respectively, of branch metric evaluation circuit 24. On the other hand, the outputs of branch metric calculators $22_1-22_n$ are coupled to multipliers $41_1 \sim 41_n$, respectively. Binary converters $39_1-39_n$ convert the normal indicating signal to a unity value and the alarm signal to zero and supply their outputs to an adder 40 in which they are summed together to produce a signal indicating a total number of normal signals. The outputs of converters $39_1 \sim 39_n$ are further supplied to multipliers $41_1-41_n$, respectively, so that the quality signal obtained from diversity antenna $20_k$ is multiplied with the corresponding branch metric obtained from that diversity antenna. The outputs of multipliers $41_1 \sim 41_n$ are summed by a second adder 42 to give a total value of quality-weighted branch metrics. The outputs of adders 40 and 42 are then supplied to an arithmetic division circuit 43 in which the total of the quality-weighted branch metrics is divided by the total number of normal signals to produce an output which is representative of the weighted mean value of the individual branch metrics, the output signal being coupled through an output terminal 44 as a final branch metric to the Viterbi decoder 25.

Figure 9:
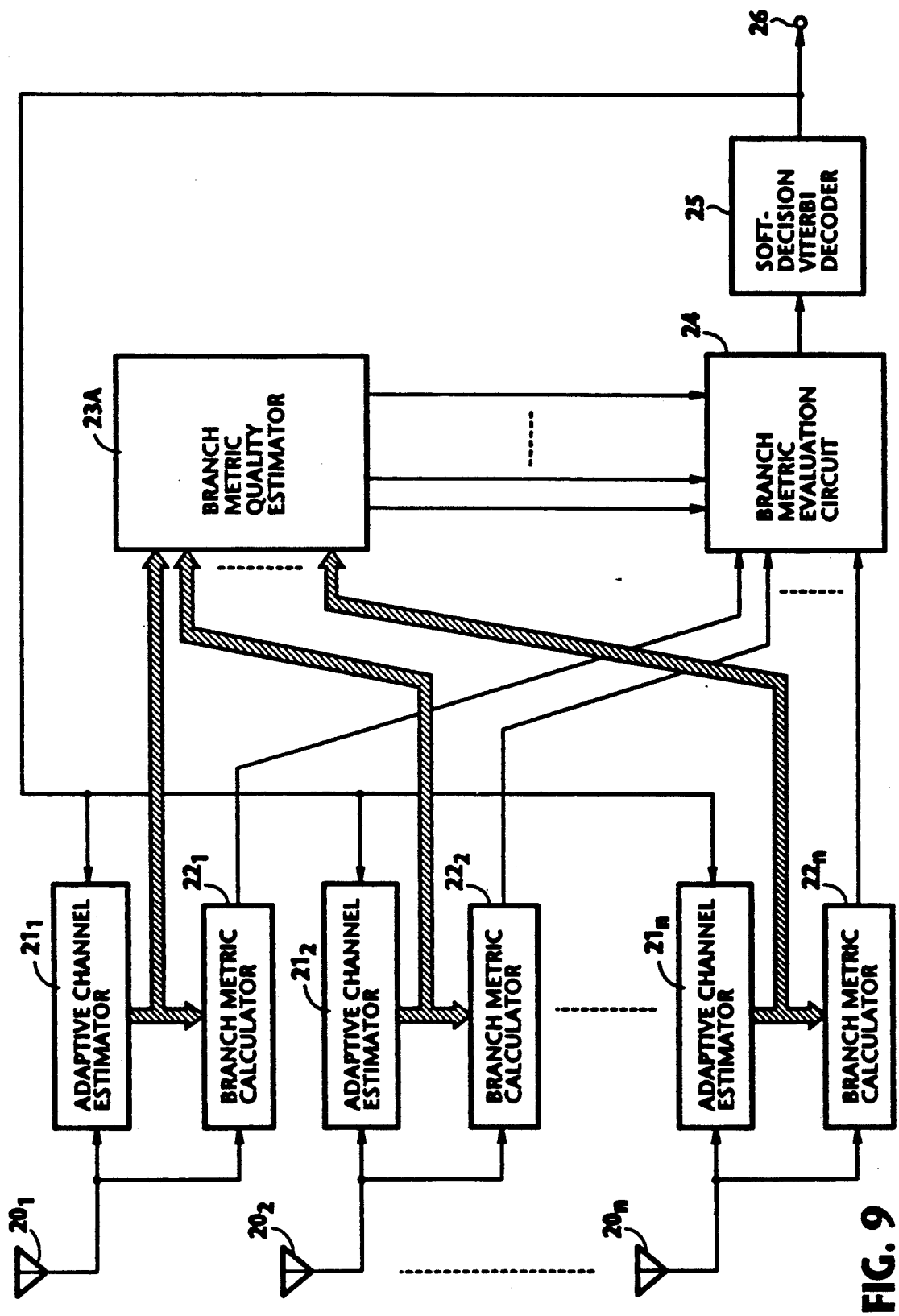
FIG. 9 shows in block form a modification of the second embodiment of the present invention.
Figure 10:
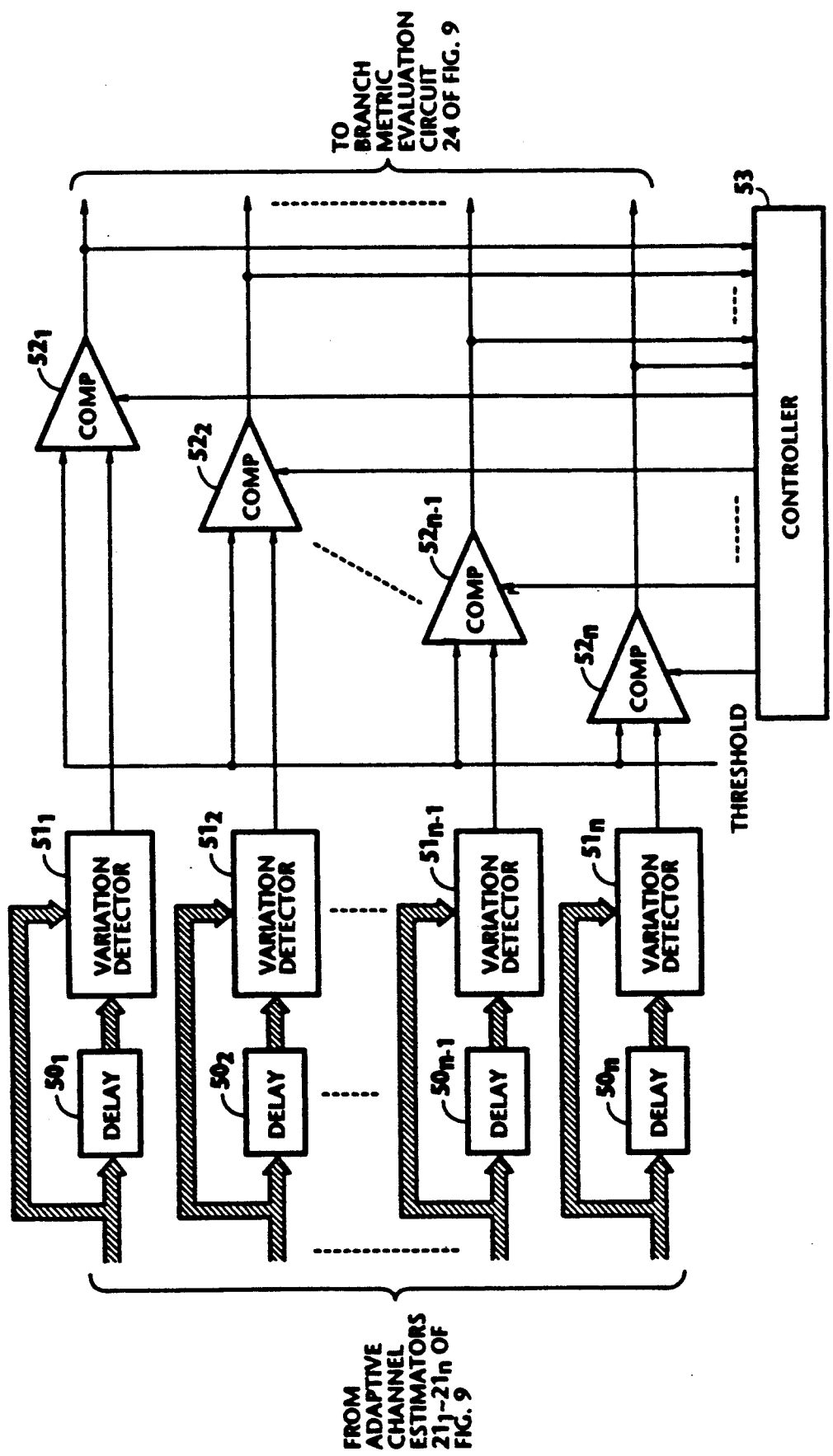
FIG. 10 shows details of the branch metric quality estimator of FIG. 9.

A modified form of the embodiment of FIG. 5 is shown in FIG. 9 in a branch metric quality estimator 23A is used instead of branch metric quality estimator 23. Branch metric quality estimator 23A receives impulse response estimates $\vec{h}_k(i+1)$ (or tap weight coefficients) from adaptive channel estimators $21_1-21_n$, rather than their error signals $e_k$. As shown in detail in FIG. 10, the impulse response estimates from adaptive channel estimators $21_1 \sim 21_n$ are supplied through delay circuits $50_1-50_n$ to first input ports of variation detector $51_1-51_n$, respectively, on the one hand, and further supplied direct to second input ports of the corresponding variation detectors. Delay circuits $50_1-50_n$ introduce a unit delay time to their input signals. Each of the variation detectors $51_1-51_n$ calculates a differential vector $\Delta \vec{h}_k$ between successive vectors of impulse response estimates $\vec{h}_k(i-1)$ and $\vec{h}_k(i)$. Each variation detector proceeds to calculate the absolute values of the components of the impulse response differential vector and detect a maximum value of the absolute values as an output signal of the variation detector. In this way, the output of each variation detector 51 represents the maximum level of variations that occurred during each unit time, or unit symbol time. Under normal circumstances, the speed of variation of channel impulse response at each diversity antenna is significantly smaller than the baud rate. Therefore, it can be considered that the validity of channel impulse response estimate is lost if the output of each variation detector is greater than the difference between adjacent signal points of digital modulation. The outputs of variation detectors $51_1 \sim 51_n$ are supplied to comparators $52_1$-$52_n$, respectively, for making comparisons with a predefined threshold value representing the minimum value of difference between adjacent signal points of digital modulation. In a manner similar to the comparators of FIG. 7, the outputs of comparators $52_1$-$52_n$ (either normal or alarm) are coupled to branch metric evaluation circuit 24 of FIG. 9 and further to a controller 53 which causes the comparators to maintain their alarm signals.

If the signal to noise ratio of a given channel has degraded in comparison with other channels to such an extent that a significant error has occurred in impulse response estimation, such a condition is detected by branch metric quality estimator 23 and its adverse effect on other signals is suppressed.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A diversity receiver having a plurality of diversity antennas for simultaneously receiving sequentially coded symbol sequences transmitted over distinct communications channels from a point of transmission to said antennas, comprising:

a plurality of channel estimators respectively coupled to said diversity antennas for deriving estimates of impulse responses of said communication channels respectively from coded symbol sequences received by said antennas;

a plurality of matched filters associated respectively with said channel estimators and said diversity antennas, each of said matched filters having a tapped delay line coupled to the associated antenna and a plurality of multipliers coupled respectively to successive taps of said tapped delay line for controlling tap weight coefficients of said multipliers in response to an output signal from the associated channel estimator and integrating weighted signals generated by said multipliers to produce a matched filter output;

a branch metric calculator for receiving the outputs of said matched filters and said estimates from said channel estimators for calculating a branch metric of the signals received by the antennas; and a maximum likelihood sequence estimator coupled to said branch metric calculator.

2. A diversity receiver as claimed in claim 1, wherein said branch metric calculating circuit comprises:

a plurality of branch metric coefficient calculators for receiving output signals from said channel estimators for calculating branch metric coefficients; and a plurality of first adders for summing output signals from said branch metric coefficient calculators with output signals from said matched filters; and a second adder for adding the outputs of said first adders to produce a branch metric.

3. A diversity receiver as claimed in claim 1, wherein said branch metric calculator comprises:

a vector adder for providing vector summation of impulse response vectors from said channel estimators to produce an output impulse response vector;

a branch metric coefficient calculator for deriving a branch metric coefficient from said output impulse response vector, and an adder for summing output signals from said matched filters and said branch metric coefficient to produce a branch metric.

4. An adaptive diversity receiver having a plurality of diversity antennas for simultaneously receiving signals over distinct communications channels from a point of transmission to said antennas, comprising:

a plurality of adaptive channel estimators respectively coupled to said diversity antennas for deriving estimates of impulse responses of said communication channels respectively from signals received by said antennas and a previously received signal;

a plurality of branch metric calculators coupled respectively to said diversity antennas for deriving first branch metrics respectively from said signals respectively received by said antennas;

a branch metric quality estimator coupled to said adaptive channel estimators for deriving from output signals of said channel estimators a plurality of branch metric quality estimates of said communications channels, respectively;

a branch metric evaluation circuit coupled to said branch metric calculators and said branch metric quality estimators for evaluating said first branch metrics in accordance with said branch metric quality estimates and producing a second branch metric; and a maximum likelihood sequence estimator for deriving a maximum likelihood estimate of said received signals from said second branch metric and applying said maximum likelihood estimate to said adaptive channel estimators as said previously received signal.

5. An adaptive diversity receiver as claimed in claim 4, wherein said second branch metric produced by said evaluation circuit is representative of a weighted mean value of said branch metrics, weighted with said branch metric quality estimates.

6. An adaptive diversity receiver as claimed in claim 4, wherein each of said adaptive channel estimators includes means for generating an error signal representative of a difference between an output signal from said maximum likelihood sequence estimator and a corresponding one of said signals respectively received by said diversity antennas and supplying said error signal as one of said output signals supplied from said adaptive channel estimators to said branch metric quality estimator.

7. An adaptive diversity receiver as claimed in claim 6, wherein said branch metric quality estimator comprises:

a plurality of power detector circuits for deriving signals representative of the power levels of said signals respectively received by said antennas from the error signals supplied from said adaptive channel estimators; and a plurality of comparator means coupled respectively to said power detector means for comparing said power representative signals with a threshold value and generating a plurality of signals each indicating whether the respective power representative signal is higher or lower than said threshold value.

8. An adaptive diversity receiver as claimed in claim 6, wherein each of said adaptive channel estimators comprises:
- a tapped delay having for receiving said output signal from said maximum likelihood sequence estimator;
- a plurality of multipliers respectively coupled to successive taps of said delay line;
- an adder for integrating output signals of said multipliers to produce an adder output;
- delay means for introducing a delay time to a corresponding one of said signals respectively received by said antennas by an amount corresponding to the amount of time taken for said corresponding signal to appear at the output of said maximum likelihood sequence estimator;
- error detector means for detecting a difference between said adder output and an output signal of said delay means to generate said error signal; and
- processor means for deriving tap weight coefficients from signals at said successive taps and said error signal and supplying said coefficients to said multipliers, respectively, and to a respective one of said branch metric calculators as said impulse response estimates.

9. An adaptive diversity receiver as claimed in claim 4, wherein each of said adaptive channel estimators comprises:
- a tapped delay having for receiving said output signal from said maximum likelihood sequence estimator;
- a plurality of multipliers respectively coupled to successive taps of said delay line;
- an adder for integrating output signals of said multipliers to produce an adder output;
- delay means for introducing a delay time to a corresponding one of said signals respectively received by said antennas by an amount corresponding to the time taken for said corresponding signal to appear at the output of said maximum likelihood sequence estimator;
- error detector means for detecting a difference between said adder output and an output signal of said delay means to generate an error signal; and
- processor means for deriving tap weight coefficients from signals at said successive taps and said error signal and supplying said coefficients to said multipliers, respectively, and to a respective one of said branch metric calculators as said impulse response estimates.

10. An adaptive diversity receiver as claimed in claim 9, wherein said branch metric quality calculator comprises:
- a plurality of variation detector means coupled respectively to said adaptive channel estimators for detecting time-varying components from the channel estimates; and
- a plurality of comparator means coupled respectively to said variation detector means for comparing said time-varying components with a threshold value and generating a plurality of signals each indicating whether the respective time-varying components is higher or lower than said threshold value.

11. An adaptive diversity receiver as claimed in claim 7 or 9, wherein said evaluation circuit comprises:
- a first adder for deriving a first value representative of a sum of output signals from said comparators;
- a plurality of weighting means for respectively weighting said branch metrics with the output signals from said comparators;
- a second adder for summing the weighted branch metrics to produce a second value; and
- a division circuit for arithmetically dividing said second value with said first value to produce said second branch metric.

12. An adaptive diversity receiver as claimed in claim 7 or 9, wherein each of said comparator means has a hysteresis characteristic for maintaining the output signal thereof when said threshold value is exceeded.

* * * * *